(12) United States Patent
Kawanaka

(10) Patent No.: US 11,321,055 B2
(45) Date of Patent: May 3, 2022

(54) PROGRAM CREATION ASSISTANCE DEVICE

(71) Applicant: Keyence Corporation, Osaka (JP)

(72) Inventor: Masashi Kawanaka, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 17/066,499

(22) Filed: Oct. 9, 2020

(65) Prior Publication Data
US 2021/0149643 A1 May 20, 2021

(30) Foreign Application Priority Data

Nov. 19, 2019 (JP) ............................. JP2019-209185

(51) Int. Cl.
*G06F 8/34* (2018.01)
*G06F 8/30* (2018.01)

(52) U.S. Cl.
CPC ............... *G06F 8/34* (2013.01); *G06F 8/313* (2013.01)

(58) Field of Classification Search
None
See application file for complete search history.

(56) References Cited

U.S. PATENT DOCUMENTS

| | | | |
|---|---|---|---|
| 6,894,623 B2 | 5/2005 | Hama et al. | |
| 7,411,319 B2 | 8/2008 | Suhara et al. | |
| 7,696,469 B2 | 4/2010 | Inoue et al. | |
| 2007/0055863 A1* | 3/2007 | Araki | G05B 19/058 713/151 |
| 2013/0253940 A1* | 9/2013 | Zziwa | G06Q 10/0635 705/2 |
| 2014/0222383 A1* | 8/2014 | Eitzman | G05B 19/4068 703/1 |

(Continued)

FOREIGN PATENT DOCUMENTS

JP 2008282341 A 11/2008

OTHER PUBLICATIONS

U.S. Appl. No. 17/066,491, filed Oct. 9, 2020 (65 pages).
U.S. Appl. No. 17/066,501, filed Oct. 9, 2020 (72 pages).
U.S. Appl. No. 17/066,503, filed Oct. 9, 2020 (70 pages).

*Primary Examiner* — Philip Wang
*Assistant Examiner* — Rongfa P Wang
(74) *Attorney, Agent, or Firm* — Kilyk & Bowersox, P.L.L.C.

(57) ABSTRACT

The present invention provides a mechanism capable of creating, in a simplified manner, a safety program in accordance with a safety use. A program creation assistance device assists in creation of the safety program to be executed by a safety controller. The program creation assistance device selects a safety use of the safety program to be created in accordance with user input, determines, based on the safety use selected, an input block to which a safety input signal from an input device is assigned and a functional block that implements a safety function suitable for the safety use selected, the input block and the function block making up the safety program, provides an unfinished safety program in a programmable manner, the unfinished safety program including the blocks determined, and supplements the unfinished safety program to create the safety program in accordance with user input.

17 Claims, 14 Drawing Sheets

(56) References Cited

U.S. PATENT DOCUMENTS

| | | | |
|---|---|---|---|
| 2015/0185708 A1* | 7/2015 | Prosak | G05B 19/056 700/79 |
| 2015/0186118 A1* | 7/2015 | Prosak | G05B 19/056 717/109 |
| 2015/0187524 A1* | 7/2015 | Prosak | G05B 19/0426 361/160 |
| 2016/0062575 A1* | 3/2016 | Yamamichi | H04N 1/00503 715/765 |
| 2016/0259313 A1* | 9/2016 | Liu | G05B 23/0216 |
| 2017/0262568 A1* | 9/2017 | Sakurai | G05B 19/0425 |
| 2018/0259926 A1* | 9/2018 | Fujimura | G06F 3/0481 |
| 2020/0259432 A1* | 8/2020 | Ando | H02P 3/18 |
| 2021/0011449 A1* | 1/2021 | Klesk | F16P 3/00 |

\* cited by examiner

PROGRAM CREATION ASSISTANCE DEVICE

CROSS-REFERENCE TO RELATED APPLICATIONS

The present application claims foreign priority based on Japanese Patent Application No. 2019-209185, filed Nov. 19, 2019, the contents of which are incorporated herein by reference.

BACKGROUND OF THE INVENTION

1. Field of the Invention

The present invention relates to a program creation assistance device that assists in creation of a safety program that runs on a safety system.

2. Description of Related Art

Many industrial machines operate in a production factory that produces products (workpieces). A safety system is an essential system for securing the safety of humans against such industrial machines. In most cases, the safety system brings an industrial machine into emergency stop when a human enters an operating area of the industrial machine.

A computer program that runs on such a safety system is called a safety program. The safety program is intended to protect the safety of humans and thus needs to be designed more accurately. When the creation of the safety program is complicated, a bug is likely to occur. It is therefore desirable to provide a program creation environment that allows a user to easily create the safety program. For example, a function block diagram (FBD) is known, based on which a plurality of function blocks are placed at random, and some of the function blocks are connected, so that the safety program is created (JP 2008-282341 A).

However, the creation of the safety program requires technical knowledge even with the FBD, and there is only a limited number of designers capable of making an accurate design. For example, the construction of the safety program requires selecting various input blocks, function blocks, and output blocks suitable for a safety use (application) of the safety program, and placing such blocks in a suitable manner. As described above, the creation of the safety program relies on specific developers (users), thereby increasing a burden of constructing the safety system that falls on such developers. Therefore, when a mechanism is provided that allows a user who is not sufficiently familiar with the safety program to easily create the program, the number of users who can create the safety program increases, and the burden on specific users reduces accordingly, thereby allowing the system to be constructed in a simple manner. It is also desirable to provide a more efficient work environment for users who are familiar with the safety program.

SUMMARY OF THE INVENTION

It is therefore an object of the present invention to provide a mechanism capable of creating, in accordance with a safety use, a safety program in a simplified manner.

According to an aspect of the present invention, there is provided, for example, a program creation assistance device that assists in creation of a safety program to be executed by a safety controller, the program creation assistance device including a use selection part that selects a safety use of a safety program to be created in accordance with user input, a determination part that determines, based on the safety use selected by the use selection part, an input block to which a safety input signal from an input device is assigned and a functional block that implements a safety function suitable for the safety use selected, the input block and the functional block making up the safety program, a providing part that provides an unfinished safety program in a programmable manner, the unfinished safety program including the blocks determined by the determination part, and a creation part that supplement the unfinished safety program to create the safety program in accordance with user input.

According to the aspect of the present invention, selecting the safety use allows the unfinished safety program including placement of blocks and a connection relation between the blocks to be provided as a basis, and then the safety program can be completed in accordance with a simplified user procedure.

DETAILED DESCRIPTION OF PREFERRED EMBODIMENTS

Figure 1:
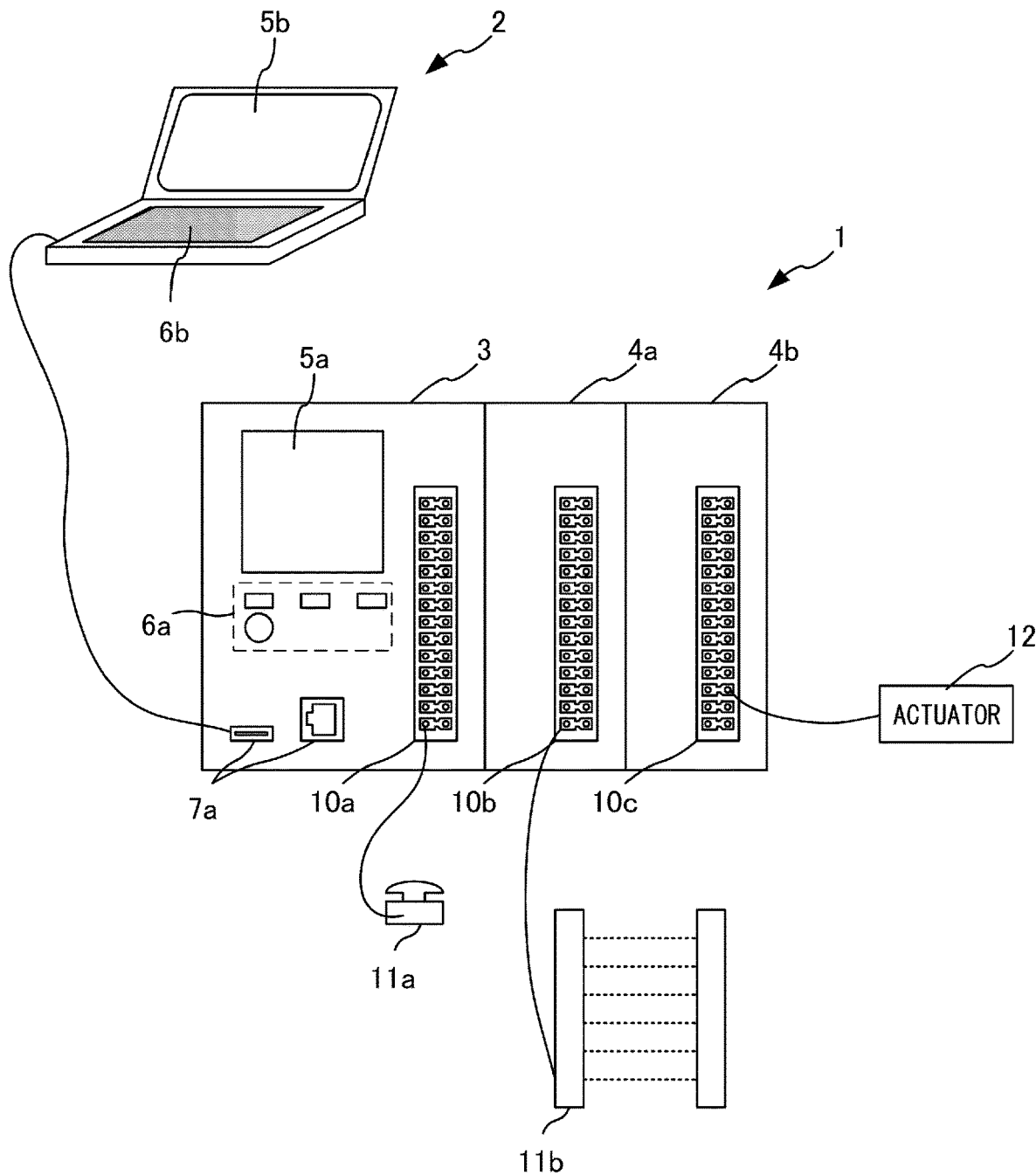
FIG. 1 is diagram for describing a safety controller system.

An embodiment will be described below in detail with reference to the accompanying drawings. Note that the following embodiment is not intended to restrict the invention according to the claims, and all combinations of the features described in the embodiment are not essential to the invention. At least two of the plurality of features described in the embodiment may be selectively combined. Further, the same or similar components are denoted by the same reference numerals, and no repetition of the same description is made. In particular, lowercase alphabets are given to make a distinction between a plurality of components of the same type, and when a description common to a plurality of components is given, the lowercase alphabets may be omitted.

<Safety Controller System>

FIG. 1 shows the whole of a system. In this example, a safety controller system 1 includes a main module (main controller) 3 and extension modules 4a, 4b. The main module 3 executes a safety program transferred from a PC 2 that serves as a creation assistance device to assist a user in creating the safety program. The main module 3 includes a display device 5a, a control panel 6a, a communication connector 7a, an IO connector 10a, and the like. The PC 2 similarly includes a display device 5b and a control panel 6b. The communication connector 7a may be a USB connector or a wired LAN connector. A communication cable from the PC 2 is connected to the communication connector 7a. The wired LAN may be industrial Ethernet (registered trademark). LAN is an abbreviation for local area network. A safety input device 11a such as an emergency stop switch or a light curtain is connected to an input terminal of the IO connector 10a. An industrial device such as a robot arm is connected, as an actuator, to an output terminal of the IO connector 10a. The main module 3 performs an arithmetic operation on an input value input from the safety input device 11a in accordance with the safety program to obtain an output value and outputs the output value to the actuator 12. For example, when the emergency stop switch that is a type of safety input device 11a, is pressed down, the main module 3 changes the output value from ON (safe) to OFF (not safe). This brings the actuator 12 to a stop. In some case, the IO connector 10a provided in the main module 3 cannot accept connections from all safety input devices and actuators. In order to deal with such a case, the extension modules 4a, 4b are connected to the main module 3. The extension modules 4a, 4b include IO connectors 10b, 10c, respectively, and are capable of accepting connections from a safety input device 11b, the actuator 12, and the like. The extension modules 4a, 4b and the main module 3 communicate with each other to transfer an input signal and an output signal. That is, the main module 3 generates the output signal by applying the safety program to the input signals acquired from the safety input device 11a connected to the main module 3 and from the safety input device 11a connected to the extension modules 4a, 4b. Furthermore, the main module 3 outputs the output signal generated in accordance with the safety program to the actuator 12 connected to the main module 3 or to the actuator 12 connected to the extension modules 4a, 4b.

<Hardware of Main Module and Extension Module>

Figure 2:
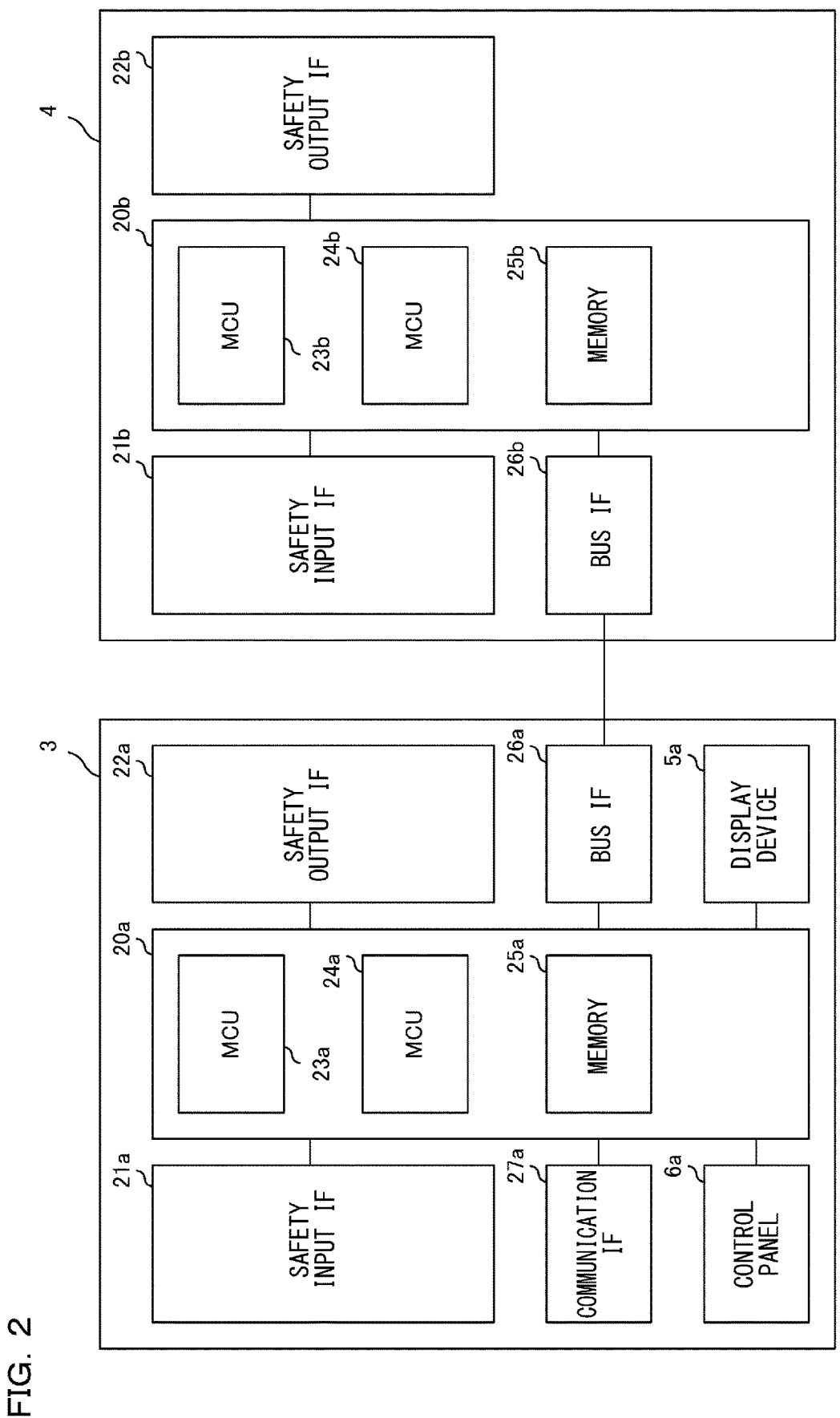
FIG. 2 is a diagram for describing a main module and an extension module.

As shown in FIG. 2, a controller 20a of the main module 3 includes two MCUs 23a, 24a and a memory 25a. The controller 20a stores the safety program received from the PC 2 into the memory 25a. Two micro controller units (MCUs) are provided to increase reliability. The MCUs 23a, 24a each execute the safety program stored in the memory 25a. The MCUs 23a, 24a generate an output signal based on an input signal input from the safety input device 11 via a safety input IF 21a and an input signal input from the extension module 4 via a bus IF 26a, and output the output signal to a safety output IF 22a and the extension module 4. For example, when both of the MCUs 23a, 24a output an ON signal, the safety output IF 22a outputs an ON signal. When either or both of the MCUs 23a, 24a output an OFF signal, the safety output IF 22a outputs an OFF signal. As described above, the controller 20a communicates with the extension module 4 via the bus IF 26a to receive the input signal and send the output signal.

A controller 20b of the extension module 4 includes two MCUs 23b, 24b and a memory 25b. Two micro controller units (MCUs) are provided to increase reliability. The MCUs 23b, 24b each execute a control program stored in the memory 25b. Upon receipt of an input signal from the safety input device 11 via a safety input IF 21b, the controller 20b sends the input signal to the main module 3 via a bus IF 26b. Upon receipt of an output signal from the main module 3 via the bus IF 26b, the controller 20b outputs the output signal to the actuator 12 or the like via the safety output IF 22b.

<Hardware of PC>

Figure 3:
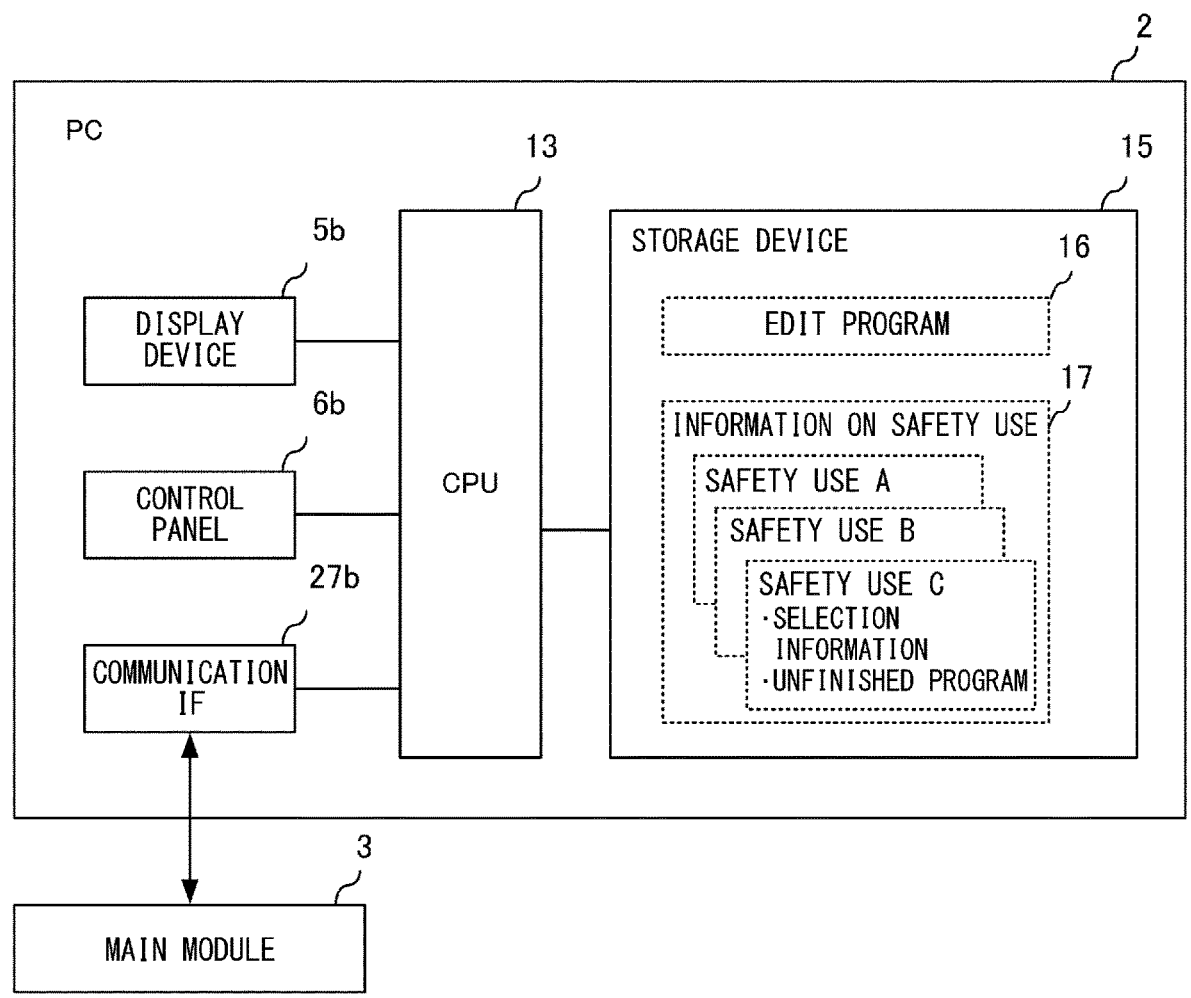
FIG. 3 is a diagram for describing a program creation assistance device.

As shown in FIG. 3, the PC 2 includes a CPU 13, the display device 5b, the control panel 6b, a storage device 15, and a communication IF 27b. The display device 5b, the control panel 6b, the storage device 15, and the communication IF 27b are each electrically connected to the CPU 13. Examples of the storage device 15 include a RAM, a ROM, an HDD, and an SSD, and may further include a removable memory card. CPU is an abbreviation for central processing unit. ROM is an abbreviation for read-only memory. RAM is an abbreviation for random access memory. HDD is an abbreviation for hard disk drive. SSD is an abbreviation for solid state drive.

The storage device 15 stores an edit program 16 and information on safety use 17. These pieces of information are allowed to be updated later. The user of the PC 2 causes the CPU 13 to execute the edit program 16 stored in the storage device 15 to edit the safety program, configuration information, or the like through the control panel 6b and to transfer the safety program, the configuration information, or the like to the main module 3. The configuration information includes identification information on the extension module 4 connected to the main module 3, and identification information (terminal assignment information) on the safety input device 11 and the actuator 12 each connected to a corresponding one of the input terminals and output terminals provided in the IO connectors 10a to 10c. The information on safety use 17 includes various pieces of information on safety use for use in inquiring of the user about selection of a safety use to be described later. Examples of the information on safety use 17 include, for each safety use, selection information for use in selection, by the user, of a safety use, and placement information and connection information on functional blocks and input and output blocks (input and output devices) suitable for the selected safety use, and the like. The connection information is information representing an input and output relation between the blocks.

<User Interface (UI) in Standard Mode>

Figure 4:
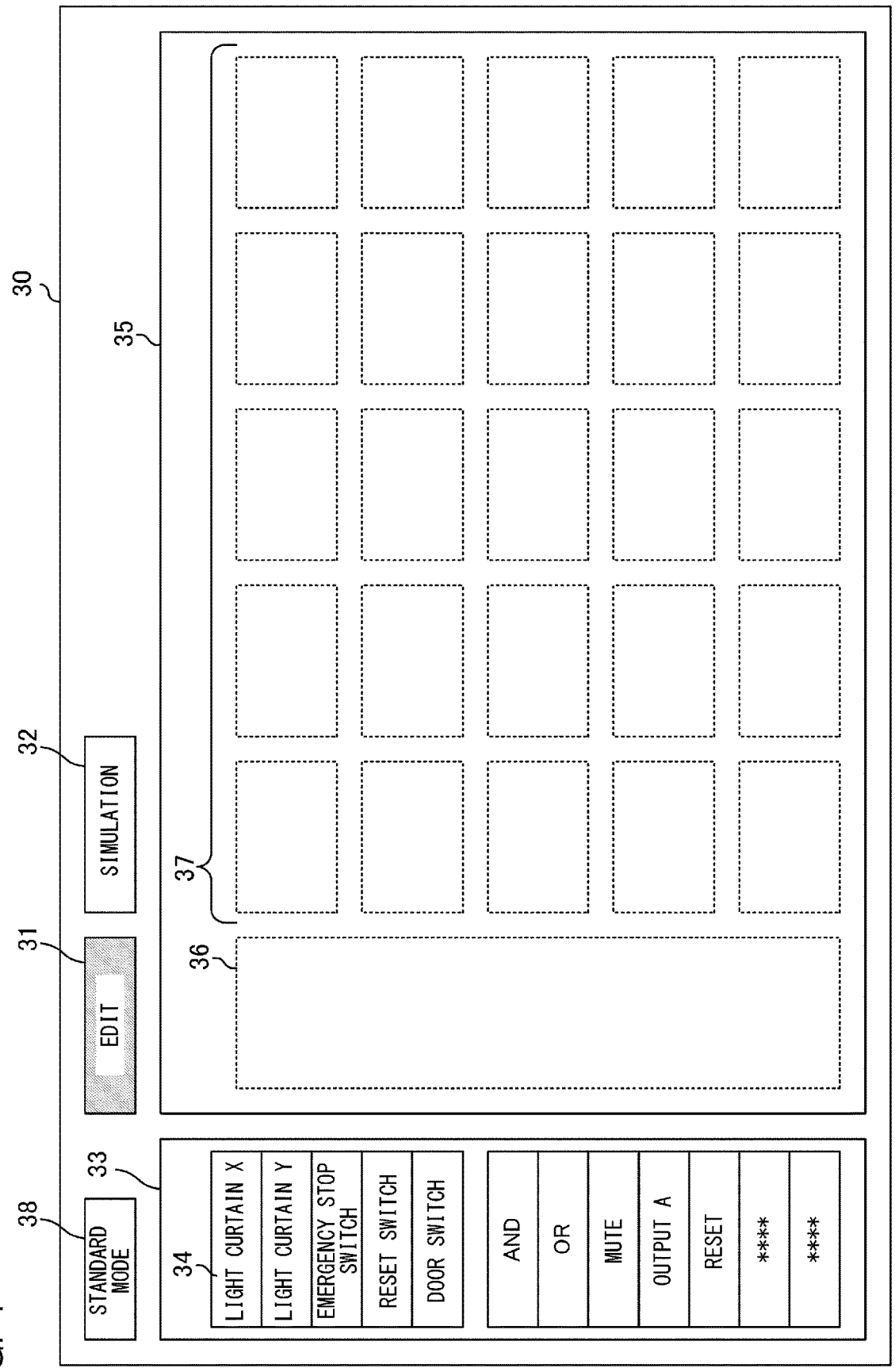
FIG. 4 is diagram for describing a user interface.

FIG. 4 shows a UI 30 in a standard mode to be displayed by the CPU 13 on the display device 5b in accordance with the edit program 16. A display denoted by 38 indicates that the edit program is running in the standard mode. For the creation of the safety program according to the present embodiment, a configuration may be employed where either the standard mode (first mode) that allows programming in a detailed manner or an EASY mode (second mode) that allows programming in a simplified manner as compared with the standard mode is selectable. The standard mode allows the user to freely place and connect an input block to which a safety input signal from an input device is assigned, a functional block (also referred to as a function block) that implements a safety function suitable for the selected safety use, and an output block that outputs a safety output signal. On the other hand, the EASY mode provides, when the user selects a safety use, an unfinished safety program in which the placement and connection of blocks suitable for the safety use have been made, and allows the user to supplement the unfinished safety program in a simplified manner to bring the unfinished safety program to completion. The details will be described later. Note that the present invention is not limited to such a configuration, and may be implemented as a program assistance device that supports only the EASY mode, for example.

An edit button 31 is a button for giving an instruction for editing the safety program. A simulation button 32 is a button for giving an instruction for simulating the safety program. A list section 33 is a display area where a list of function blocks 34 that can be selected by the user is displayed in a selectable manner. A program creation area 35 includes an input placement area 36 where a function block of an input type is placed, and a block placement area 37 where a function block of an operation type and a function block of an output type are placed. Note that a function block of the input type may also be placed in the block placement area 37. The user selects any one of the function blocks 34 from the list section 33 and drag-and-drops the function block 34 thus selected to the input placement area 36 or the block placement area 37. The input placement area 36 and the block placement area 37 are displayed in a scrollable manner, and each allow more function blocks to be placed.

(Editing of Program)

Figure 5:
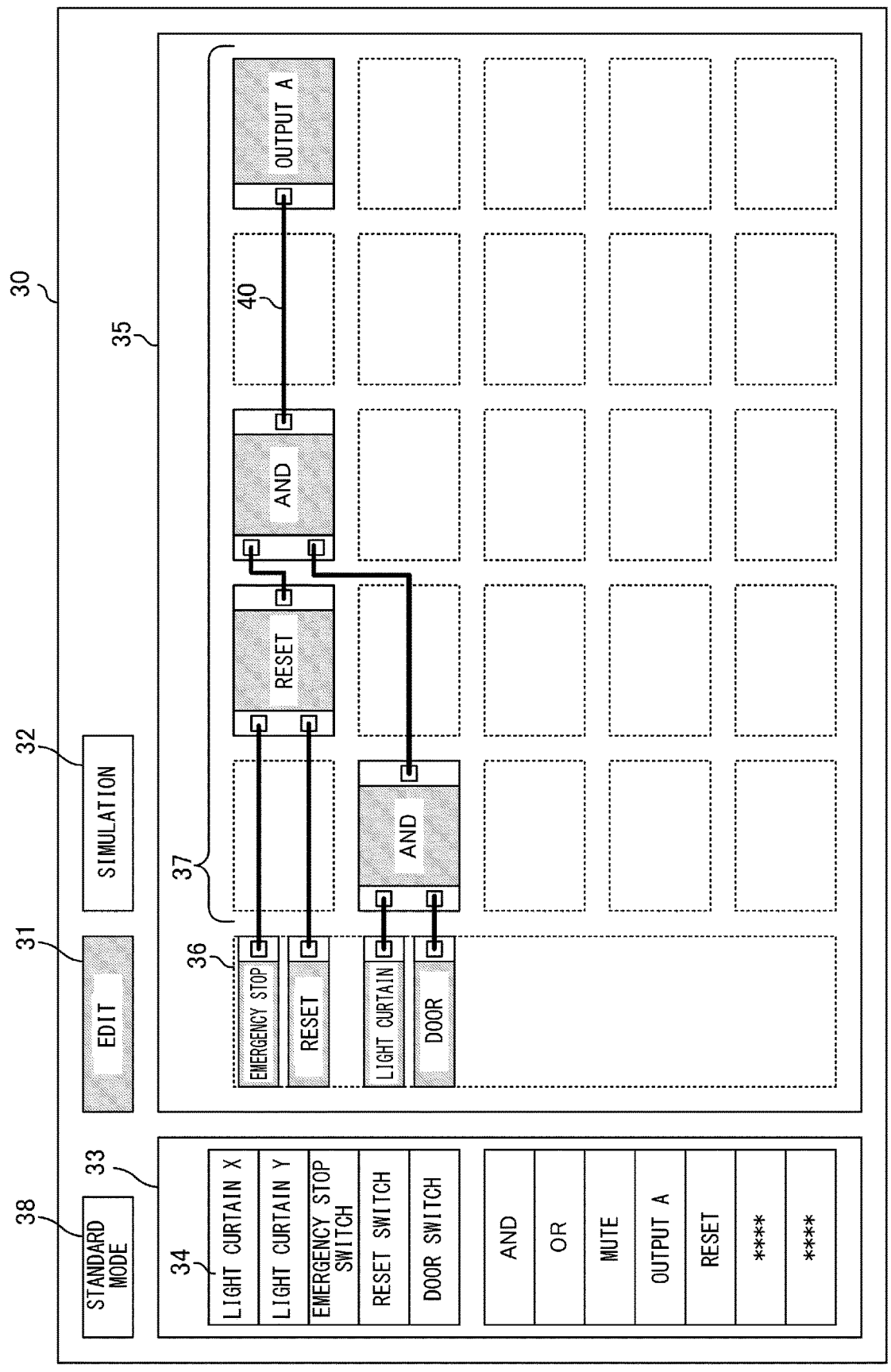
FIG. 5 is a diagram for describing a user interface.

FIG. 5 shows an example of creating the safety program in the standard mode. Input blocks corresponding to the safety input devices 11 connected to the main module 3 and the extension module 4 are placed in the input placement area 36. In FIG. 5, an input block corresponding to an emergency stop switch, an input block corresponding to a reset switch, an input block corresponding to a light curtain X, and an input block corresponding to a door switch are dragged and dropped from the list section 33 to the input placement area 36.

In the block placement area 37, two AND blocks, a reset block, and an output block are placed. The output block corresponds to any one of the output terminals of the IO connectors 10a to 10c. An icon representing each function block includes an input terminal and an output terminal. The user connects the output terminal of one function block and the input terminal of another function block with a connection line 40 to complete the safety program.

In this example, the reset block outputs ON (safe) when the emergency stop button is not pressed. A left AND block outputs ON when the light curtain is ON and the door switch is ON. The output terminal of the reset block and the output terminal of the left AND block are connected to a right AND block. Therefore, when ON is input to both the two input terminals of the right AND block, the right AND block outputs ON to the output block. When the emergency stop button is pressed, OFF (unsafe) is input to the reset block. As a result, the output of the right AND block switches from ON to OFF, and OFF is transmitted to the output block. The reset block keeps outputting OFF unless the reset switch is pressed. The reset block returns to ON when the reset switch is pressed.

The CPU 13 creates configuration information including information on types of the function blocks and program components that make up the safety program and connection information representing a connection relation between the function blocks, and stores the configuration information into the storage device 15. This configuration causes the safety program to be included in the configuration information. Alternatively, the CPU 13 may link the program components in accordance with the connection information to create the safety program. When the user inputs a transfer instruction, the CPU 13 sends the configuration information and the safety program to the main module 3 to program the main module 3. The configuration information may be part of the safety program.

As described above, the user can create the safety program by combining any function blocks. Note that, when the simulation button 32 is pressed, the CPU 13 displays a simulation UI on the display device 5b.

<Case where Connection Check Succeeds (Program is Completed)>

Figure 6:
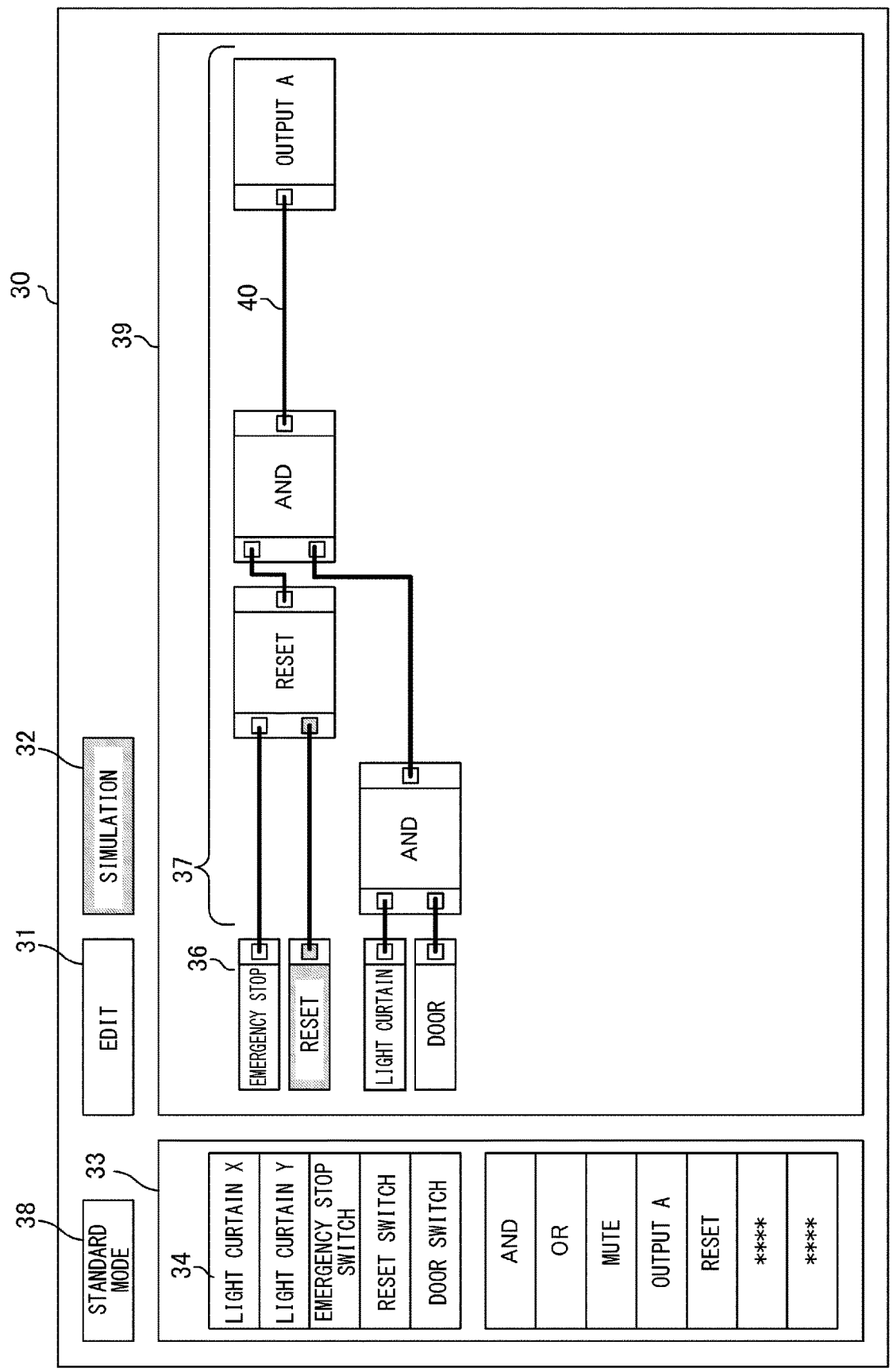
FIG. 6 is a diagram for describing a user interface.

FIG. 6 shows the UI 30 including a simulation screen 39. When the simulation button 32 is pressed, the CPU 13 displays the simulation screen 39 in the UI 30. The simulation screen 39 may be displayed in a window separate from the UI 30. When the user touches or clicks on a function block of the input type, the output of the function block of the input type is inverted (from ON to OFF or from OFF to ON). Such an inversion may be called toggle. Note that the CPU 13 may display a function block outputting ON and a function block outputting OFF in a distinguishable manner. In FIG. 6, a block corresponding to the reset switch is highlighted because the block is touched by the user to be turned to OFF. Note that the CPU 13 may color the function block outputting ON light green (or light blue) and the function block outputting OFF light pink (orange) or the like. Further, the CPU 13 may color both an output terminal outputting ON and an input terminal receiving ON dark green (dark blue). The CPU 13 may color both an output terminal outputting OFF and an input terminal receiving OFF red (dark orange). The CPU 13 performs an operation on input signals to obtain an output signal in response to the input signals for each function block. The user can confirm the overall behavior of the safety program by touching or clicking on any desired input block.

<Case where Connection heck Fails (Program is not Completed)>

When the simulation button 32 is pressed, the CPU 13 may execute a connection check on a plurality of function blocks placed in the block placement area 37. Depending on the type of function block, terminals that need to be connected and terminals that need not be connected exist. The CPU 13 checks, for all the function blocks, for connection of the connection line 40 to a terminal that needs to be connected. When the connection line 40 is not connected to the terminal that needs to be connected, the CPU 13 determines that the connection check has failed. This disallows the CPU 13 to execute the simulation of the entire safety program, and thus proceeds to individual simulation.

<Selection of Programming Mode>

Figure 7:
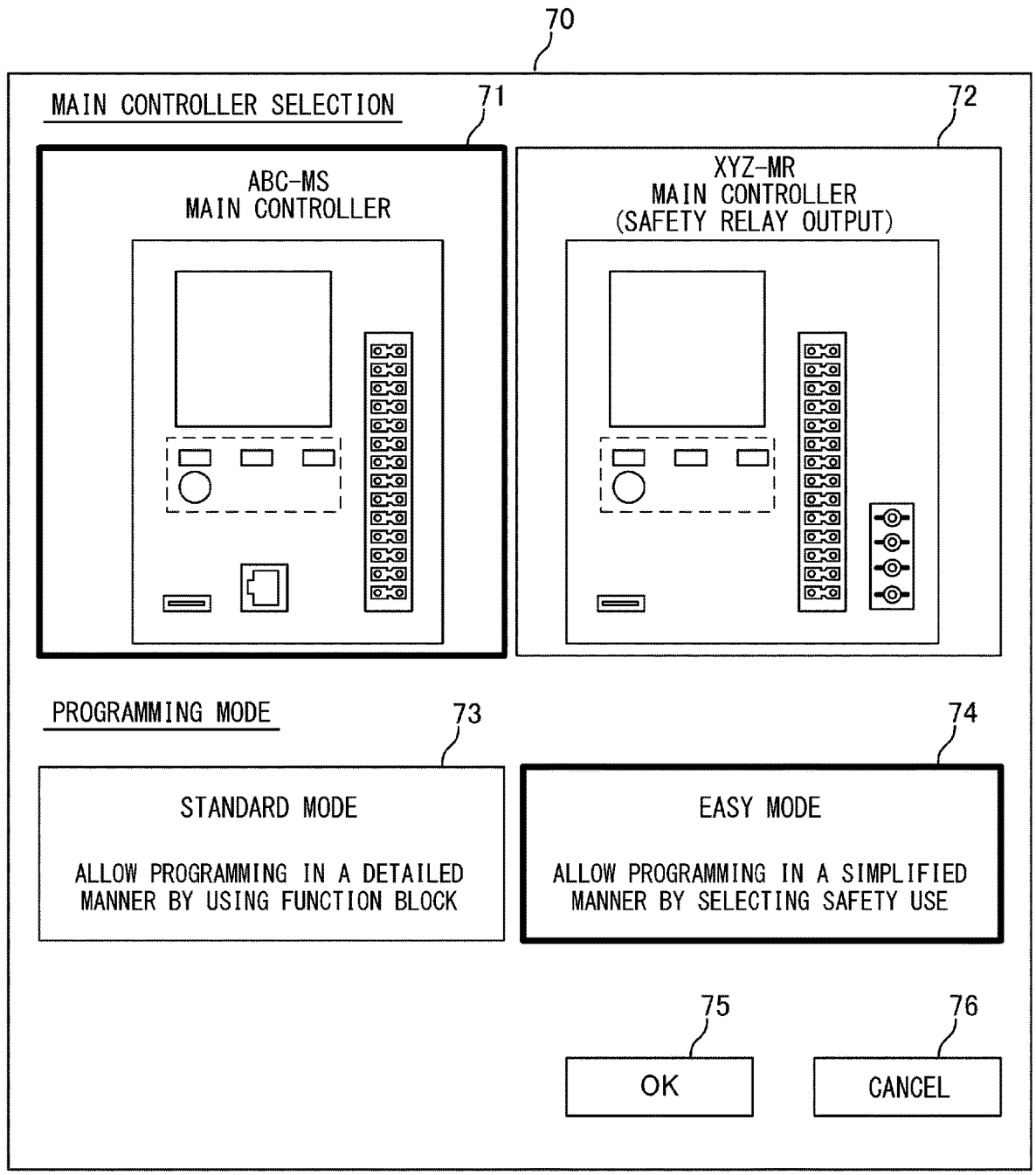
FIG. 7 is a diagram for describing a user interface.

FIG. 7 shows a user interface for selecting a device to which the safety program to be created is applied and a programming mode for creating the safety program. A selection screen 70 is displayed, under the control of the CPU 13, on the display device 5b of the PC 2. On the selection screen 70, a main controller serving as the main module, and a programming mode can be selected. In the example shown in FIG. 7, a main controller that executes the safety program to be created can be selected from two main controllers 71, 72. As the programming mode, a standard mode (first mode) 73 or an EASY mode (second mode) 74 can be selected.

The standard mode 73 allows, as described with reference to FIG. 4 and FIG. 5, the user to freely select and place an input block, a function block, and an output block, and freely connect terminals. That is, the standard mode 73 is a programming mode having a high degree of freedom. On the other hand, the EASY mode 74 provides, when the user selects a safety use, an unfinished safety program in which blocks suitable for the safety use have been already placed and connected. The unfinished program according to the present embodiment is provided in a state where an input device assigned to an input block has yet to be assigned. The user can complete the safety program in a simplified manner by assigning, at user's own discretion, an input device to a predetermined input block. Note that the present invention is not intended to be restricted by a degree of completion at the time when such an unfinished safety program is provided.

That is, according to the present invention, the unfinished safety program may be provided in any unfinished state where, for example, a connection from an input block to a functional block is unfinished. Further, the unfinished safety program may be provided in a state that allows an additional block to be placed.

When an OK button 75 on the selection screen 70 is operated with the main controller and the programming mode selected, the mode is determined, and a transition to a corresponding edit screen (program creation screen) is made. When the standard mode 73 is selected, the safety program is created in accordance with to the flow shown in FIG. 4 to FIG. 6 described above. A case where the EASY mode 74 is selected will be described later. On the other hand, when a cancel button 76 is operated, a transition back to a screen displayed before the transition to the selection screen 70 is made with neither the main controller nor the programming mode selected.

<User Interface (UI) in EASY Mode>

(Registration of Input and Output Device)

Figure 8:
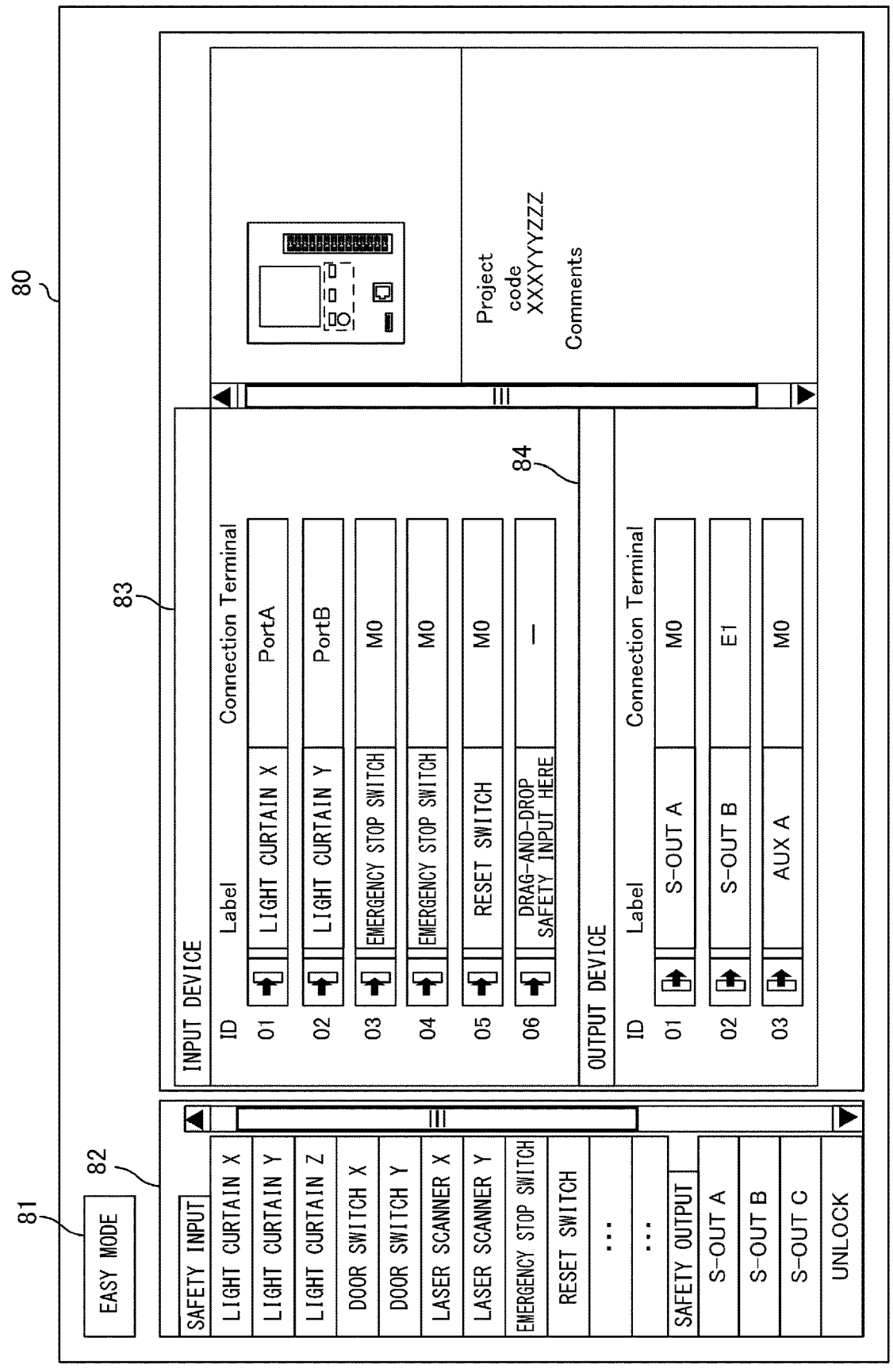
FIG. 8 is a diagram for describing a user interface.

FIG. 8 shows a registration screen 80 in the EASY mode where input and output devices are registered. The registration screen 80 is displayed, under the control of the CPU 13, on the display device 5b of the PC 2. The registration screen 80 is a screen to which a transition is made basically when the OK button 75 is operated with the EASY mode selected on the selection screen 70. On the registration screen 80, an input block (input device) and an output block (output device or output terminal) of the safety program to be created are registered. A display 81 indicates that the programming mode is the EASY mode. In an area 82, lists of safety input devices and safety output devices that can be registered are displayed. The edit program 16 or information on the edit program 16 is subsequently updated, allowing other input and output devices to be added to the lists. An area 83 is a registration space for an input device. The user can drag-and-drop, to the area 83, an input device for use in the safety system to be constructed from the list of input devices displayed in the area 82 to register the input device. In the example shown in FIG. 8, input devices such as a light curtain, an emergency stop switch, and a reset switch are registered. Note that, for each registered device, a connection terminal to be connected to the main controller can be registered. An area 84 is a registration space for an output device. The user can drag-and-drop, to the area 84, an output device for use in the safety system to be constructed from the list of output devices displayed in the area 82 to register the output device. In the example shown in FIG. 8, output devices such as an S-OUT, and an AUX output are registered. Note that, for each registered device, a connection terminal to be connected to the main controller can be registered. A confirm button such as an OK button (not shown) is operated with the input and output devices registered to complete the registration of the input and output devices.

(Selection of Safety Use)

Figure 9:
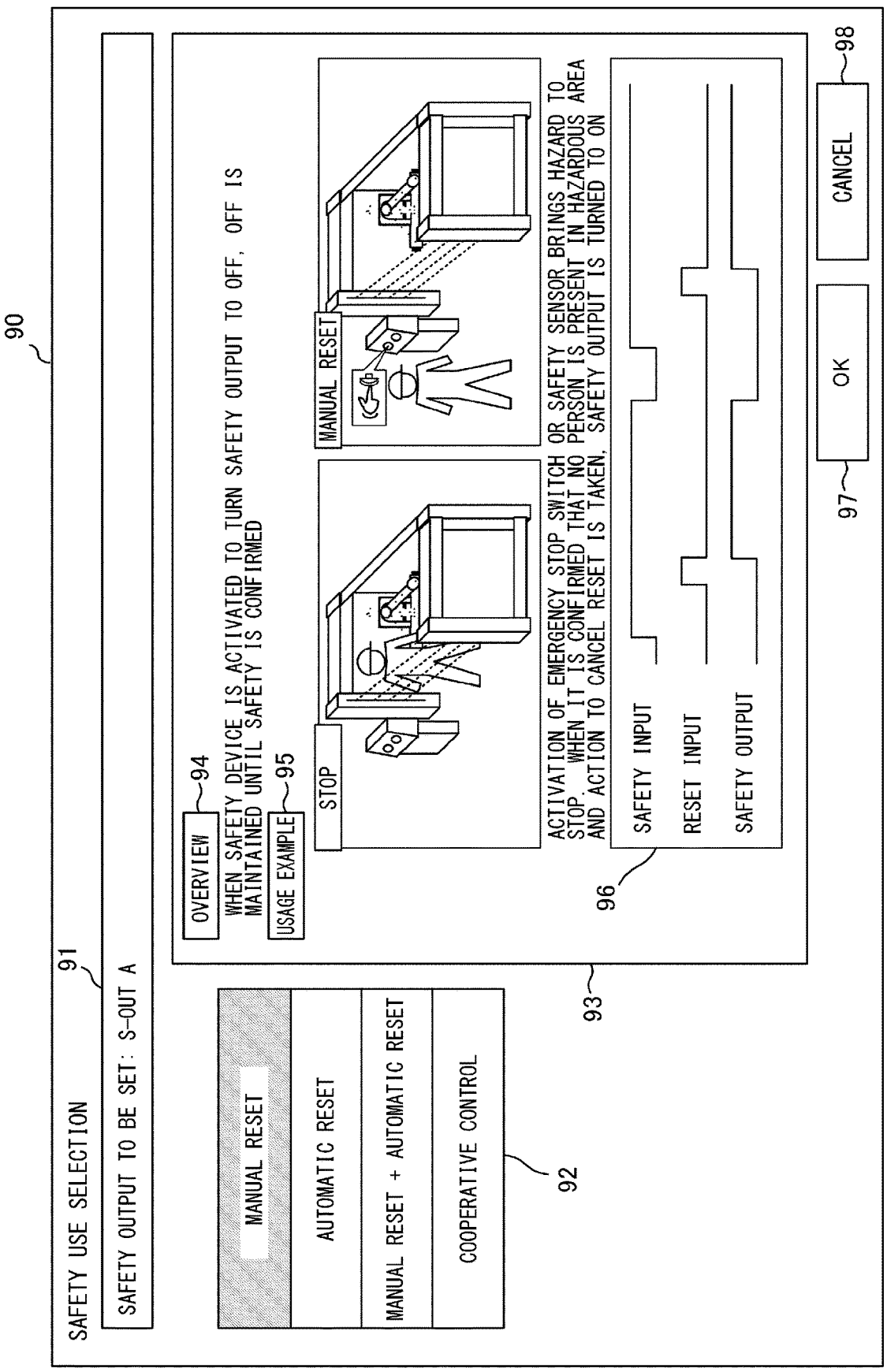
FIG. 9 is a diagram for describing a user interface.
Figure 10:
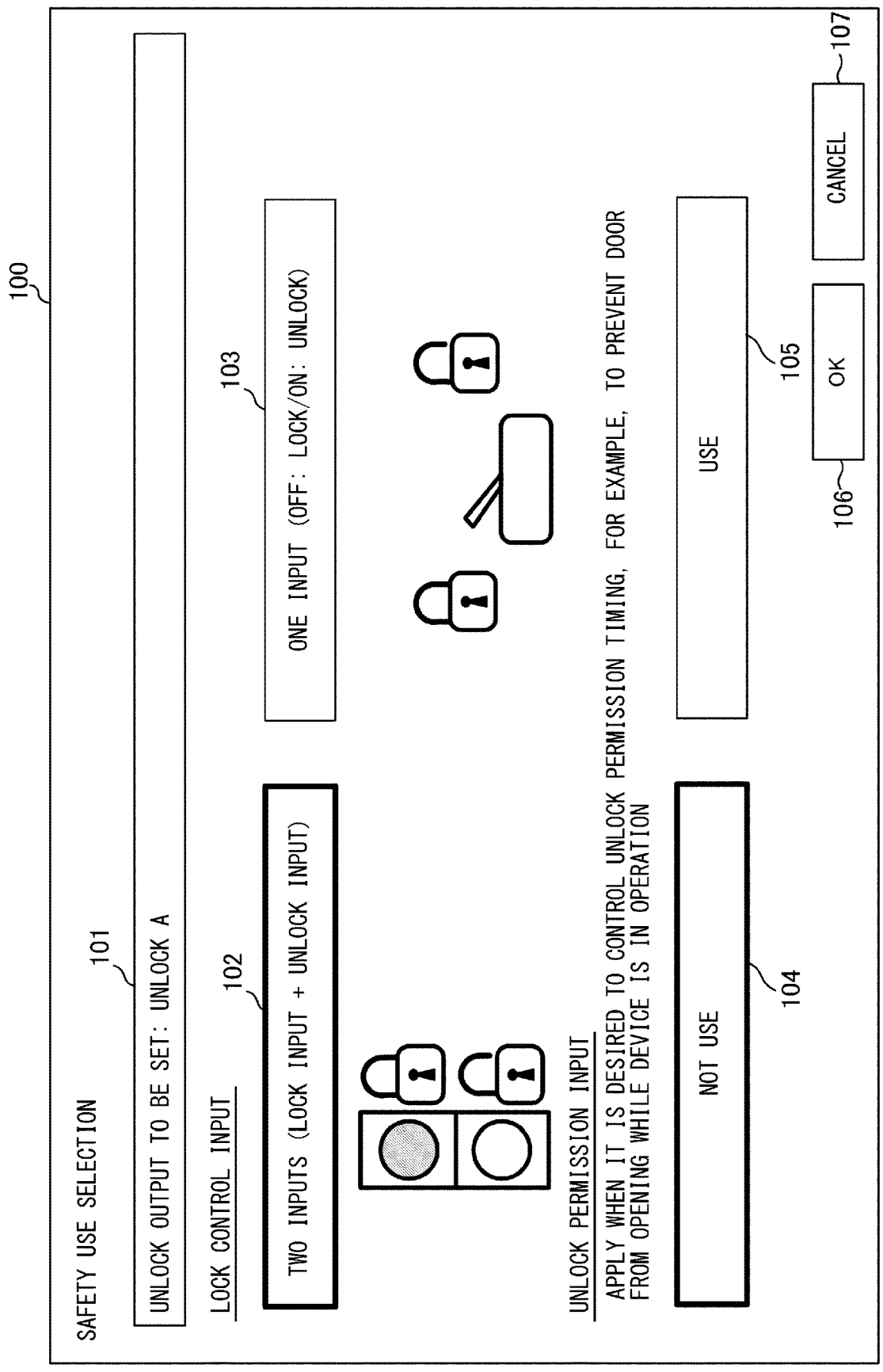
FIG. 10 is a diagram for describing a user interface.

FIG. 9 and FIG. 10 show selection screens 90, 100 in the EASY mode where a safety use is selected. The selection screens 90, 100 are displayed, under the control of the CPU 13, on the display device 5b of the PC 2. Provided on the selection screens 90, 100 are choices of safety uses conceivable for each output device selected on the registration screen 80, and a safety use can be selected in accordance with user input. That is, according to the present embodiment, the selection screens 90, 100 are displayed after safety input and output devices are registered on the registration screen 80. However, the present invention is not limited to such a configuration, and, for example, after selecting a safety use, safety input and output devices may be registered for each safety use thus selected.

First, the selection screen 90 shown in FIG. 9 will be described. The selection screen 90 allows selection of a safety use including at least one of a manual reset or an automatic reset in accordance with to a safety output (S-OUT) to be set. As shown in FIG. 9, the selection screen 90 includes a safety output 91 to be set, choices of safety uses 92, a description field 93 of a safety use to be selected, an OK button 97, and a cancel button 98. The choices 92 include four choices, a manual reset, an automatic reset, a manual reset+ automatic reset, and a cooperative control. The manual reset is a mechanism where safety is confirmed with reference to ON of a safety input after a safety output is turned to OFF in response to OFF of the safety input, and then the safety output is turned to ON by a reset switch or the like (the safety system is activated). This mechanism is applied to, for example, a reset from a case where the emergency stop switch is operated, a case where a light curtain is installed at an entrance to a hazardous area, or a place where a door may be closed unexpectedly. The automatic reset is a mechanism where safety is confirmed with reference to ON of a safety input after a safety output is turned to OFF in response to OFF of the safety input, and then the safety output is automatically turned to ON. The manual reset+ automatic reset is a mechanism that uses both a safety input that operates on the manual basis and a safety input that operates on the automatic reset basis. This is a mechanism where when both the safety inputs are turned to ON, a safety output is turned to ON (the safety system is activated). The collaborative control is simply referred to as a mechanism based on an OR operation of the manual reset+ automatic reset. For example, the collaborative control may be applied to a case where an operator and a robot may enter the same hazardous area, and then a light curtain installed at each entrance is controlled. In this case, when only the safety input of one of the light curtains is turned to OFF, the safety output is not turned to OFF because a human and a robot do not enter the hazardous area at the same time, and when both the light curtains are turned to OFF, the safety output is turned to OFF.

For each of the choices of safety uses, a description such as a use case is displayed in the description field 93 of the selection screen 90. In the description field 93 corresponding to each choice, for example, an overview 94, a usage example 95, and a timing chart of safety input, safety output, and reset input are displayed. In the overview 94, an overview of control for each choice is described. In the usage example 95, a relation between a human and a robot in a hazardous area, a reset procedure, and the like are described. The timing chart 96 shows the above-described input and output timing relation and shows a detailed reset timing. The user can operate the OK button 97 with any one of the choices 92 selected to select the safety use. Further, when the cancel button 98 is operated, a transition is made back to the screen displayed before the transition to the selection screen 90.

Next, the selection screen 100 shown in FIG. 10 will be described as another selection example of safety use. On the selection screen 100, in accordance with a safety output (unlock output) to be set, it is possible to select a safety use from, for example, a safety use based on a two-input system 102 and a safety use based on a one-input system 103 as a type of lock control. Further, it is possible to select a case 104 where an unlock permission input is used or a case 105 where the unlock permission input is not used. The unlock permission input is applied to a case where it is desired to control unlock permission timing, for example, to prevent the door from opening while the device is in operation. The user can operate an OK button 106 with any one of the lock control input or the unlock permission input selected from the choices 102 to 104 to select a safety use. When the cancel button 98 is operated, a transition is made back to the screen displayed before the transition to the selection screen 107.

As described above, according to the present embodiment, a suitable selection screen is provided to the user in accordance with a registered safety output and allows the user to select a safety use. At this time, the CPU 13 of the PC 2 refers to the information on safety use 17 that includes information on safety use selectable for each safety output and is stored in the storage device 15 and presents a selection screen suitable for the user. Note that, according to the present embodiment, the method for controlling the selection screen to be presented in accordance with the registered safety output has been described, but the method is not intended to restrict the present invention, and may be controlled in a manner that depends on the registered safety input, for example, or alternatively, in a manner that depends on both the safety output and the safety input. Even in those cases, necessary information is prestored in the storage device 15. Alternatively, the present invention may allow control to select a safety use before the safety input or safety output is registered. In this case, the control may be made on an interactive basis where available safety uses are presented in list form, and, in accordance with a selected safety use, an additional question is put to the user and asks the user to make further user input. Then, a safety input and a safety output may be registered. At this time, a safety input or a safety output recommended for the selected safety input may be presented.

(Creation of Program in EASY Mode)

Figure 11:
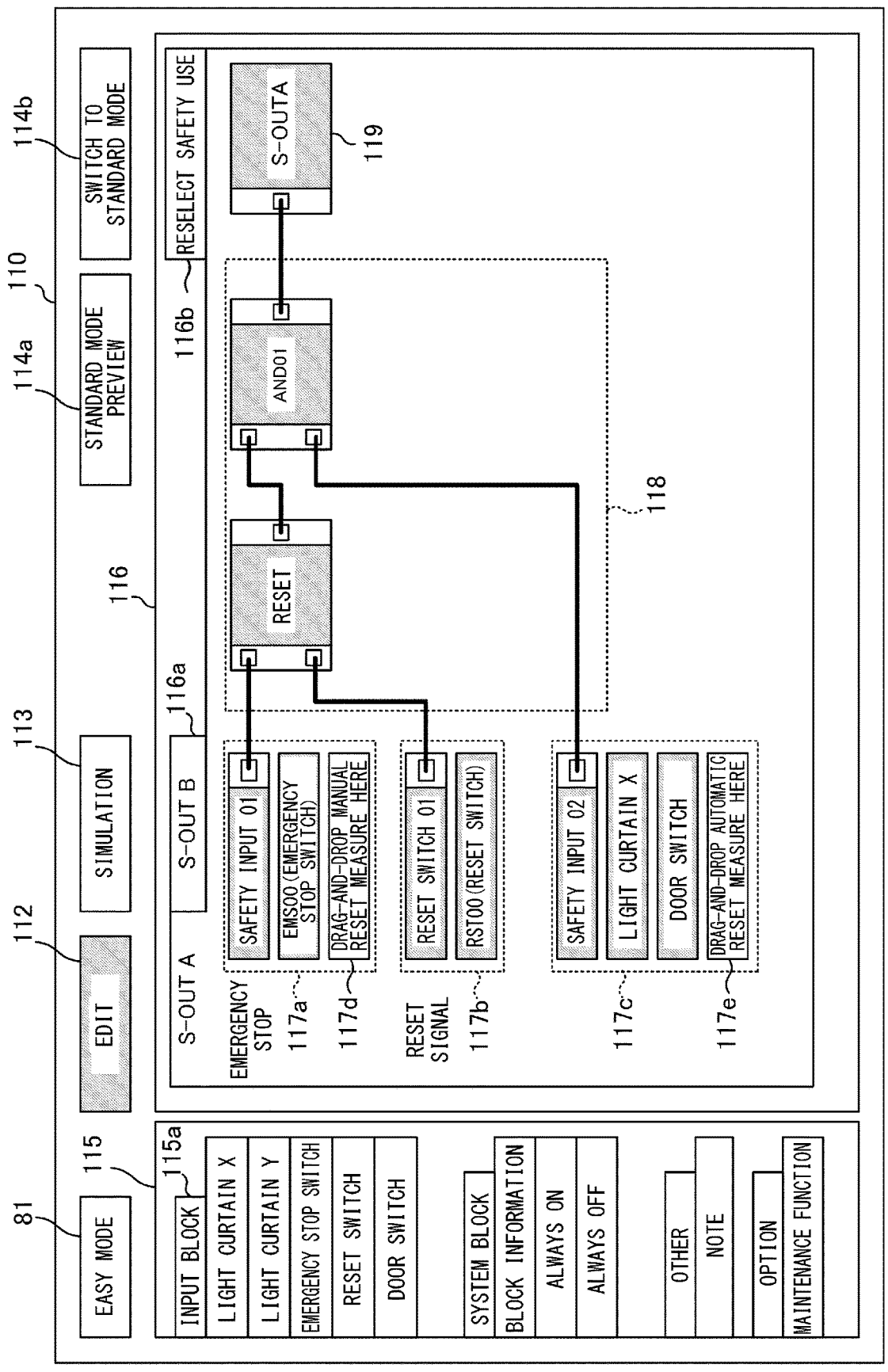
FIG. 11 is a diagram for describing a user interface.

FIG. 11 shows an edit screen 110 in the EASY mode. The edit screen 110 is displayed, under the control of the CPU 13, on the display device 5*b* of the PC 2. On the edit screen 110, an unfinished safety program is presented in accordance with the safety use selected by the user for each safety output, and the program can be created on a supplementary basis in a simplified procedure. That is, with a plurality of safety outputs registered, an unfinished safety program corresponding to each of the plurality of safety outputs may be provided. The unfinished safety program is a program in a state where functional blocks suitable for the selected safety use, and registered input blocks and output blocks are placed, the input and output between the blocks is connected, and no input device is assigned to each of the input blocks.

The edit screen 110 includes the display 81 indicating the EASY mode, an edit button 112, a simulation button 113, a standard mode preview button 114*a*, a standard mode switching button 114*b*, a list section (first area) 115, and a program creation area (second area) 116. In FIG. 11, with the edit button 112 selected, the unfinished safety program provided in the program creation area 116 is made editable. Creation of a program in the EASY mode is made by assigning input devices for use in the safety system to be constructed from lists displayed in the list section 115 to input blocks 117*a* to 117*c* in the program creation area 116. In the list section 115, input devices registered via the registration screen 80 are displayed in a selectable manner. The user can drag-and-drop an input device 115*a* displayed in the list section 115 to a predetermined place in the program creation area 116 such as an add box 117*d*, 117*e* to assign the input device to an input block. When an input device is assigned to the add box 117*d* or 117*e*, another add box to which an input device can be assigned is displayed, thereby increasing the number of input devices to be assigned. When an input device is assigned to the add box 117*d* or 117*e*, a logical block that performs a logical operation on signals from a plurality of input devices assigned and outputs a result of the logical operation is inserted in an input block. Therefore, even when an input device is additionally inserted, the logical operation is internally performed in the input blocks 117*a*, 117*c*, thereby maintaining one output terminal as it is. Examples of the logical block include an AND block that performs a logical product operation or an OR block that performs a logical sum operation. It is needless to say that the logical block may be a block that performs a different logical operation. Basically, when all the input devices registered in the registration of input and output devices are assigned, the program is completed. Note that the input blocks such as the input blocks 117*a*, 117*c* to which safety input devices are assigned are basically configured to output a logical product of a plurality of input devices because a machine needs to be stopped when an error occurs at any place. On the other hand, when a reset signal is input as in the input block 117*b*, it is desirable that an add box for increasing the number of input devices be not provided from the viewpoint of safety.

Further, although not shown in FIG. 11, in the list section 115 (first area), a logical block that performs a logical operation such as an AND block or an OR block may be displayed in a selectable manner. In this case, when a logical block is dragged and dropped to the add box 117*d*, 117*e* in accordance with user input, a logical box to which a plurality of input devices can be assigned is inserted in the input block 117*a*, 117*c*. The logical box performs a logical operation on signals from the assigned input devices and outputs a result of the logical operation, and the output is treated as one input signal in a corresponding input block. Therefore, the use of such a logical box allows a complicated functional block to be constructed in an input block.

Note that, as shown in FIG. 11, an example where the logical box is provided as a separate box such as the input block 117*a* or 117*c* has been described, but the example is not intended to restrict the present invention. For example, the logical box may be provided as an input block including a plurality of logical boxes in accordance with the safety use selected. At least one input device may be assigned to each logical box. Suppose that two AND boxes are provided as the plurality of logical boxes, for example. In this case, it is also possible to construct, in advance, and provide an input block in which output of an AND box 1 and output of an AND box 2 are input to one logical block, for example, an OR block, and a logical sum of the outputs is output.

The program creation area 116 is displayed for each registered output device. In the example shown in FIG. 11, as shown in tabs 116*a*, one output device (S-OUT A) is selected, and the program creation area for the output device is displayed. When another tab corresponding to another output device (S-OUT B) is selected from the tabs 116*a*, the program creation area for the output device is displayed. In the program creation area 116, an input block 117, a function block 118, and an output block 119 are displayed based on a predetermined placement relation, and input and output between the blocks is provided in a connected state (connected state). 116*b* denotes a button for reselecting a safety use for the safety output (for example, S-OUTA). When the button 116*a* is operated, a transition is made to a corresponding selection screen 90 or 100. This allows the user to select another safety use after confirming details of the unfinished safety program, thereby allowing a user-friendly operation system to be provided.

When the simulation button 113 is operated, the simulation of the safety program created as in the standard mode is executed as described with reference to FIG. 6 to allow the operation of the safety program to be checked. Note that, in the EASY mode, since the program is provided in a state where connections have already been checked, when an error occurs, the error lies in input device assignment. Examples of the error in input device assignment include a case where no assignment has been made and a case where an input device that is not recommended has been assigned to a predetermined block. When such an unrecommended input device is assigned, a corresponding error may be displayed when the user drag-and-drops the input device from the list section 115 to the program creation area 116 before the operation is checked, or alternatively, the input device may be prevented from being assigned.

When the standard mode preview button 114a is operated, a transition is made from the screen in the EASY mode to a screen for confirming a detailed block configuration and connection state as shown in the edit screen in the standard mode described with reference to FIG. 5. This screen allows only reference but not editing. On the other hand, when the standard mode switching button 114b is operated, the mode is switched from the EASY mode to the standard mode. Accordingly, a transition is made to a screen equivalent to the UI 30 shown in FIG. 5, allowing the user to freely make connect and place blocks. Note that, once the transition to the standard mode is made, a transition back to the EASY mode is not allowed. This is because a change made to a connection or block in the standard mode may cause a change in optimal function block configuration provided in accordance with the safety use in the EASY mode. For example, allowing a transition back to the EASY mode may lead to a malfunction, which is not desirable from a safety point of view. Note that a policy with respect to such mode transitions may be changed under control in accordance with a user setting. Further, when editing is not performed even after a transition to the standard mode, a transition back to the EASY mode may be made.

<Flowchart>

Figure 12:
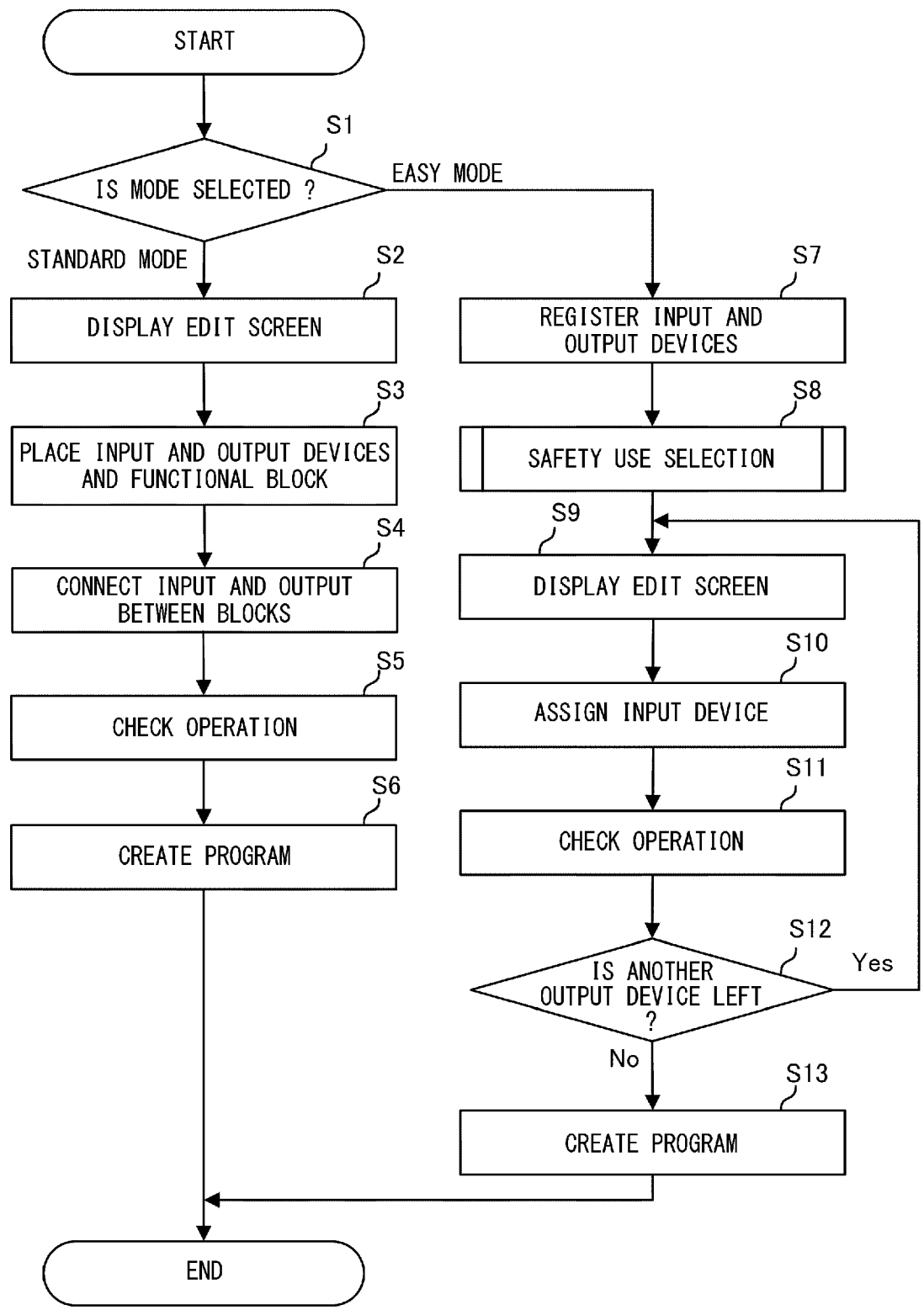
FIG. 12 is a diagram for describing a flowchart of creation of a safety program.

FIG. 12 is a flowchart showing a processing procedure of the PC 2 serving as the program creation assistance device when the safety program is created.

In S1, the CPU 13 displays, on the display device 5b, the selection screen 70 shown in FIG. 7 where a programming mode is selected, a determination is made as to which mode has been selected in response to user input. Herein, when the standard mode is selected, the process proceeds to S2, and when the EASY mode is selected, the process proceeds to S7.

When the standard mode is selected, the CPU 13 displays the edit screen 30 shown in FIG. 4 on the display device 5b in S2. Subsequently, in S3 and S4, the CPU 13 receives and edits, in accordance with a user operation, placement of input and output blocks (input and output devices) and function blocks and input and output connections between the placed blocks. Note that, for convenience sake, S3 and S4 are shown in this order, but may be executed in any order in accordance with a user operation. That is, the connections need not necessarily be made after all blocks are placed, and may be made in any order. Furthermore, S3 and S4 including S5 to be described later may be executed in any order. Next, in S5, the CPU 13 executes the simulation in response to a press of the simulation button 32 as described with reference to FIG. 6 to check the operation under the created block configuration. When the operation check has been successfully made, the CPU 13 creates a safety program based on the block configuration and connection state in S6, and brings the process to an end. Note that the created safety program is transferred to and executed by the main module 3 serving as the main controller.

On the other hand, when the EASY mode is selected, the CPU 13 displays the registration screen 80 shown in FIG. 8 on the display device 5b in S7, and registers, in accordance with user input, input and output devices for use in the safety system to be constructed. Herein, the user drag-and-drops, on the registration screen 80, the input and output devices for use in the safety system to be constructed from the area 82 to the areas 83, 84 for registration. Subsequently, in S8, the CPU 13 selects a safety use (application) for each registered output device (output terminal) in accordance with user input. Details of S8 will be described later with reference to FIG. 13.

When the safety use is selected, in S9, the CPU 13 displays, on the display device 5b, the edit screen 110 as shown in FIG. 11 where editing can be made for each registered output device. As described above, the edit screen displayed herein is provided in a state where predetermined connections are made between blocks that make up the unfinished safety program held in advance in accordance with the selected safety use. Subsequently, in S10, the CPU 13 assigns, in accordance with user input, an unassigned input device. In S10, as described above, it is possible to increase the number of input devices to be assigned based on the input device assignment in accordance with user input, and to add the above-described logical box (AND box or OR box) to an input block. Even in such a case, when all the assignments have been made, and the user operates the simulation button 113, for example, the process proceeds to S11. Note that when the number of inputs is increased, the CPU 13 inserts, into an input block as needed, a logical block that performs a logical operation on signals from a plurality of input devices assigned and outputs a result of the logical operation. In S11, the CPU 13 checks the operation of the safety program to which input devices have been assigned. In the EASY mode, placement of blocks whose operation has already been checked and the input and output connection state between the blocks are inherited, so that an operation error in the example of the present embodiment may correspond to an error in input device assignment. Examples of the error in input device assignment include a case where no assignment has been made, and a case where an input device that is not recommended has been assigned to a predetermined input block. Note that, when an input device that is not recommended is about to be assigned, a warning message or the like may be displayed.

After the operation check, in S12, the CPU 13 determines whether the editing of the other output devices registered in S7 has been completed. When the editing has yet to be completed, the process returns to S9, and S9 to S11 are repeated for each registered output device. When the editing has been completed, the process proceeds to S13, and the CPU 13 supplements the unfinished safety program with the assigned input devices to complete the program, and brings the process to an end. Note that the created safety program is transferred to and executed by the main module 3 serving as the main controller.

Figure 13:
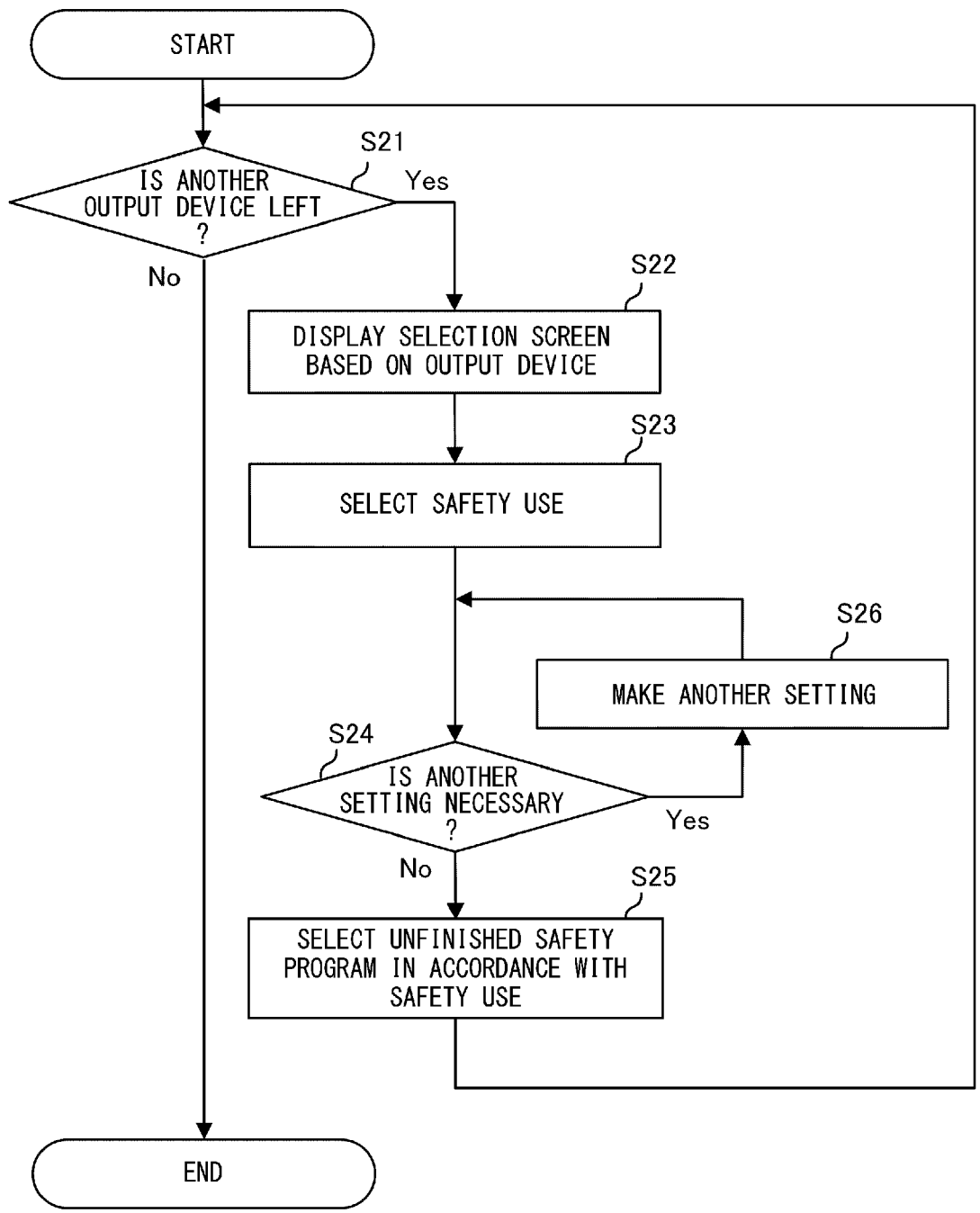
FIG. 13 is a diagram for describing a flowchart of creation of the safety program.

FIG. 13 is a flowchart showing a detailed processing procedure for selecting a safety use in S8 shown in FIG. 12.

In S21, the CPU 13 determines whether there is another input and output device registered in S7 for which a safety use has yet to be selected. When the selection of a safety use has been completed for all the output devices registered in S7, the process of this flowchart is brought to an end. On the other hand, when there is another output device for which a safety use has yet to be selected, the process proceeds to S22.

In S22, the CPU 13 displays, on the display device 5b, the selection screen where a safety use is selected based on an output device as shown in FIG. 9 and FIG. 10. In S23, the CPU 13 select a safety use in response to user input via the displayed selection screen. Subsequently, in S24, the CPU 13 determines whether another setting is necessary for the output device for which a safety use is under selection, and, when necessary, proceeds to S26 to display a screen prompting the user to make another setting, and accepts user input to make another setting. Subsequently, another determination is made in S24. The determination as to whether another setting is necessary is made with reference to the information on safety use 17 prestored in the storage device 15. It is also possible to determine whether another setting is necessary based on information selected by the user. When a determination is made in S24 that another setting is not necessary, the CPU 13 retrieves an unfinished safety program in accordance with the selected safety use from the storage device 15 in S25, and returns to S21. S21 to S26 are performed for each registered output device, and once a corresponding unfinished safety program has been successfully retrieved, this flowchart is brought to an end. As described above, according to the present embodiment, through interaction with the user, it is possible to specify, in a detailed manner, a safety use desired by the user.

<Function of CPU>

Figure 14:
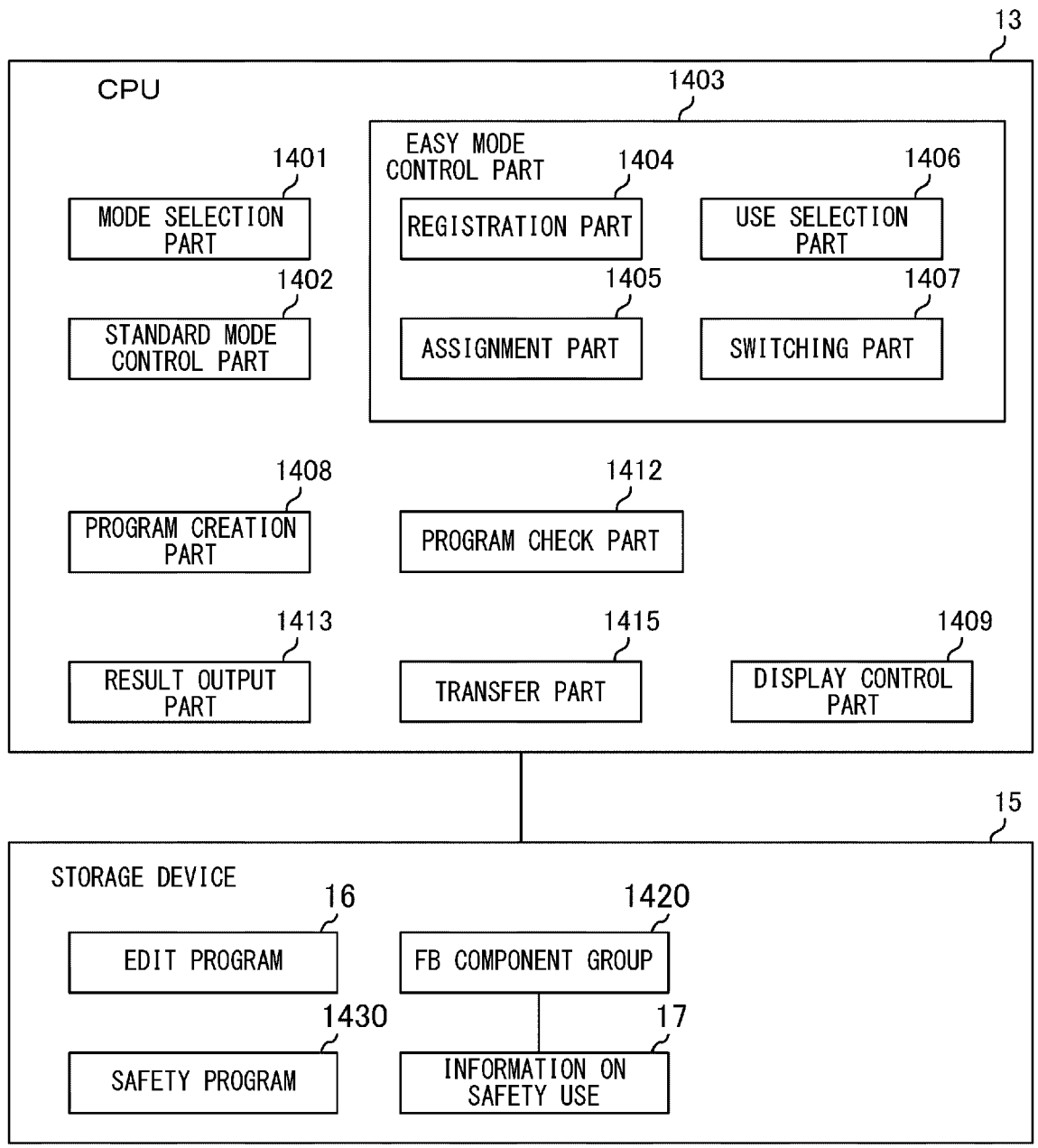
FIG. 14 is a diagram for describing functions of a CPU.

FIG. 14 shows various functions implemented via the edit program 16 executed by the CPU 13. The CPU 13 includes, as functional components, a mode selection part 1401, a standard mode control part 1402, an EASY mode control part 1403, a program creation part 1408, a display control part 1409, a program check part 1412, a result output part 1413, and a transfer part 1415. The EASY mode control part 1403 includes a registration part 1404, an assignment part 1405, a use selection part 1407, and a switching part 1407.

The mode selection part 1401 selects the programming mode in accordance with user input via the selection screen 70 shown in FIG. 7. The standard mode control part 1402 performs various types of control when the safety program is edited (created) in the standard mode using, for example, the edit screen described with reference to FIG. 4 to FIG. 6 and the like.

The EASY mode control part 1403 performs control when the safety program is edited (created) in the EASY mode. The registration part 1404 registers input and output devices in accordance with user input via the registration screen 80 shown in FIG. 8. The use selection part 1406 selects a safety use for each registered output device in accordance with user input via the selection screens as shown in FIG. 9 and FIG. 10 where a safety use is selected. The assignment part 1405 assigns the registered input devices to an unfinished safety program for each registered output device in accordance with user input. The switching part 1407 displays a preview screen if a safety program under creation in the EASY mode is created in the standard mode, and switches the programming mode from the EASY mode to the standard mode.

The display control part 1409 control the display device 5b to display various screens. A user operation made on each screen is transmitted to a corresponding functional part. For example, a user operation input via the registration screen 80 is transmitted to the registration part 1404. The program creation part 1408 creates a program edited by each of the standard mode control part 1402 and the EASY mode control part 1403. The program check part 1412 checks the operation of the program edited in each mode. In the standard mode, each placed block and an input and output connection between the blocks are checked. In the EASY mode, assignment of an input device to an input block is checked. The result output part 1413 displays an execution screen of full simulation or partial simulation (FIG. 6 and the like). The transfer part 1415 transfers a completed safety program 1430 to the main module 3.

The storage device 15 stores at least the edit program 16, an FB component group 1420, the safety program 1430, and information on safety use 1440. The edit program 16 is executed by the CPU 13 to enable each functional part to operate, as described above. The FB component group 1420 includes information on function blocks for use in list display when a functional block is placed in the standard mode. Further, in the FB component group 1420, pieces of information on function blocks included in an unfinished safety program in accordance with a safety use selected in the EASY mode are stored in association with each other. The safety program 1430 includes information on an unfinished safety program for each safety use in addition to the edited and completed safety program. The information on safety use 17 includes, for each safety use, selection information for use in selection, by the user, of a safety use, and placement information and connection information on functional blocks and input and output blocks (input and output devices) suitable for the selected safety use, and the like.

<Summary>

The PC 2 serves as the program creation assistance device that assists in creation of the safety program to be executed by the safety controller. The safety controller system 1 and the main module 3 are examples of the safety controller. The use selection part 1406 selects a safety use of the created safety program in accordance with user input. The EASY mode control part 1403 determines, based on the safety use selected by the use selection part 1406, an input block to which a safety input signal from an input device is assigned and a functional block that implements a safety function suitable for the selected safety use, the input block and the function block making up the safety program, and provides an unfinished safety program in a programmable manner, the unfinished safety program including the determined blocks. The program creation part 1408 supplements the unfinished safety program in accordance with user input to create the safety program. As described above, according to the present example, the user is caused to select a safety use to be applied to each selected output device, and is provided with the unfinished safety program based on the selected safety use. The user can easily complete the safety program by assigning an unassigned input device to the unfinished safety program. Therefore, according to the present embodiment, it is possible to provide a mechanism capable of creating, in accordance with a safety use, a safety program in a simplified manner. The mode selection part 1401 may be further provided that selects in accordance with user input a mode of creation of the safety program from the first mode that allows programming in a detailed manner and the second mode that allows programming in a simplified manner as compared with the first mode. When the second mode is selected, the mode of creation of the safety program becomes a mode that allows the above-described safety program to be easily created. This can provide a mechanism capable of creating the safety program by causing the user to select a desired mode and creating a more user-friendly safety program.

The EASY mode control part 1403 may further provide, in a programmable manner, the unfinished safety program in a state where placement of determined input blocks, functional blocks, and output blocks and input and output connections between the blocks have been made as a program creation screen (FIG. 11). The user can supplement the provided unfinished safety program to create the safety program in a simple manner.

The registration part 1404 registers at least one of at least one input device that inputs a safety input signal to an input block or at least one output device. The EASY mode control part 1403 determines the placement of input blocks, functional blocks, and output blocks and the input and output connections between the blocks based on the at least one output device registered. In this case, the program creation screen includes the first area where the at least one input device registered is displayed, in list form, in a selectable manner and the second area that shows a placement relation and connection state of the determined blocks. The user drag-and-drops an input device displayed in the first area of the program creation screen to an area in an input block displayed in the second area where the input device is assigned, so as to assign the input device that inputs a signal to the input block. As described above, according to the present embodiment, an appropriate block configuration (placement) and connection state are provided as the unfinished safety program based on the registered output device, and the user can create the safety program in a simplified manner by assigning an unassigned input device. Note that the program creation screen that allows programming for each registered output device may be provided.

Each input block included in the unfinished safety program is allowed to be assigned a plurality of input devices, performs a logical operation on signals from the plurality of input devices assigned, and outputs a result of the logical operation (117a, 117c). The assignment part 1405 and the program creation part 1408 creates, each time an input device is assigned to each input block, the safety program by inserting, into each input block, a logical block that performs a logical operation on signals from the plurality of input devices assigned. Further, in the first area, logical blocks that each perform a logical operation may be displayed in a selectable manner. In this case, the assignment part 1405 inserts, when a logical block displayed in the first area of the program creation screen is dragged and dropped, in accordance with user input, to an area in the input block displayed in the second area where an input device is assigned (add box 117d, 117e), the logical box that is allowed to be assigned a plurality of input devices, performs a logical operation on signals from the assigned input devices and outputs a result of the logical operation into the input block. As a result, even when provided as an input block, it can be configured later as a detailed functional block. The input block included in the unfinished safety program may include a plurality of logical boxes that are each allowed to be assigned a plurality of input devices, and perform a logical operation on signals from the input devices inserted and outputs a result of the logical operation, and further include a logical block that performs a logical operation on outputs from the plurality of logical boxes and outputs a result of the logical operation. As described above, the unfinished safety program to be provided after the safety use is selected may be provided in advance.

The program creation screen is capable of accepting mode switchover of the mode of creation of the safety program from the EASY mode (second mode) to the standard mode (first mode), and the EASY mode control part 1403 may provide, upon acceptance of the mode switchover via the program creation screen, a program creation screen in the first mode that makes the placement of blocks and the input and output connection between the blocks configurable. Alternatively, a detailed block configuration may be displayed as a preview screen in the standard mode representing a program currently being edited (FIG. 5 and the like). This makes it possible to provide a more user-friendly operation system.

The use selection part 1406 provides a selection screen that allows selection of any one of a plurality of safety uses. The selection screen allows selection of a safety use including at least one of the manual reset that brings a predetermined system controlled by the safety controller into operation when the user presses a reset switch after safety of the predetermined system is confirmed or an automatic reset that brings the predetermined system into operation when safety of the predetermined system is confirmed, the manual reset and the automatic reset each being a reset mechanism applied to a reset from a state where the predetermined system is stopped (FIG. 9). Further, the selection screen allows selection of a safety use with two-input lock control as lock control of the output block or a safety use with one-input lock control (FIG. 10). Further, on the selection screen, for each safety use to be selected, at least one of a corresponding usage example or a timing chart of the safety input signal and the safety output signal is displayed as a description of each safety use. As described above, even when the user who is the operator of the program creation assistance device does not have sufficient technical knowledge to create a safety program, the user can retrieve a safety program that has been partially completed (unfinished safety program) by selecting a safety use described, and supplement the program to create a safety program suitable for the selected safety use.

The invention is not limited to the above-described embodiment, and various modifications or changes may be made within the scope of the invention.

What is claimed is:

1. A program creation assistance device that assists in creation of a safety program to be executed by a safety controller, the program creation assistance device comprising:
   a use selection unit that selects a safety use of a safety program to be created in accordance with user input;
   a determination unit that determines, based on the safety use selected by the use selection unit, connected blocks including an input block to which a safety input signal from an input device is assigned and a functional block that implements a safety function suitable for the safety use selected, the input block and the functional block making up the safety program;
   a providing unit that provides an unfinished safety program in a programmable manner, the unfinished safety program including the connected blocks determined by the determination unit;
   a creation unit that supplements the unfinished safety program to create the safety program in accordance with user input; and
   a mode selection unit that selects, in accordance with user input, a mode of creation of the safety program from a first mode that allows to manually place and connect an input block and a functional block respectively and a second mode that allows to provide the unfinished safety program including the connected blocks determined, based on the safety use selected by the use selection unit, by the determination unit.

2. The program creation assistance device according to claim 1, wherein the determination unit further determines an output block that outputs a safety output signal based on the safety use selected by the use selection unit, the output block making up the safety program.

3. The program creation assistance device according to claim 2, wherein the providing unit further provides, in a programmable manner, the unfinished safety program in a state where placement of the connected blocks determined by the determination unit.

4. The program creation assistance device according to claim 3, further comprising a registration unit that registers at least one said input device that inputs the safety input signal to the input block or at least one output device, wherein
the determination unit determines the placement of the connected blocks including the input block, the functional block, and the output block, based on the at least one output device registered by the registration unit.

5. The program creation assistance device according to claim 4, wherein the providing unit provides the program creation screen including a first area where the at least one of said input device registered by the registration unit is displayed, in list form, in a selectable manner and a second area that shows a placement relation and connection state of the connected blocks determined by the determination unit.

6. The program creation assistance device according to claim 5, wherein when an input device displayed in the first area of the program creation screen is dragged and dropped, in accordance with user input, to an area in the input block displayed in the second area where the input device is assigned, the creation unit assigns the input device that inputs a signal to the input block.

7. The program creation assistance device according to claim 6, wherein each input block included in the unfinished safety program is allowed to be assigned a plurality of input devices, performs a logical operation on signals from the plurality of input devices assigned and outputs a result of the logical operation.

8. The program creation assistance device according to claim 7, wherein each time the input device is assigned to each input block, the creation unit creates the safety program by inserting, into each input block, a logical block that performs a logical operation on signals from the plurality of input devices assigned.

9. The program creation assistance device according to claim 6, wherein the input block included in the unfinished safety program includes a plurality of logical boxes that are each allowed to be assigned a plurality of input devices, and perform a logical operation on signals from input devices inserted and outputs a result of the logical operation, and further includes a logical block that performs a logical operation on outputs from the plurality of logical boxes and outputs a result of the logical operation.

10. The program creation assistance device according to claim 5, wherein
the providing unit displays, in the first area, a logical block that performs a logical operation in a selectable manner, and
when the logical block displayed in the first area of the program creation screen is dragged and dropped, in accordance with user input, to an area in the input block displayed in the second area where an input device is assigned, the creation unit inserts, into the input block, a logical box that is allowed to be assigned a plurality of input devices, performs a logical operation on signals from the input devices assigned and outputs a result of the logical operation.

11. The program creation assistance device according to claim 10, wherein the logical block displayed in the first area includes at least one logical block of an AND block that performs a logical product operation or an OR block that performs a logical sum operation.

12. The program creation assistance device according to claim 4, wherein the providing unit provides a program creation screen that allows programming for each of the output devices registered by the registration unit.

13. The program creation assistance device according to claim 3, wherein
the program creation screen is capable of accepting mode switchover of the mode of creation of the safety program from the second mode to the first mode, and
the providing unit provides, upon acceptance of the mode switchover via the program creation screen, a program creation screen in the first mode that makes the placement of the connected blocks and configurable.

14. The program creation assistance device according to claim 3, wherein the use selection unit provides a selection screen that allows selection of any one of a plurality of safety uses.

15. The program creation assistance device according to claim 14, wherein the selection screen allows selection of a safety use including at least one of a manual reset that brings a predetermined system controlled by the safety controller into operation when a user presses a reset switch after safety of the predetermined system is confirmed or an automatic reset that brings the predetermined system into operation when safety of the predetermined system is confirmed, the manual reset and the automatic reset each being a reset mechanism applied to a reset from a state where the predetermined system is stopped.

16. The program creation assistance device according to claim 14, wherein the selection screen allows selection of a safety use with two-input lock control as lock control of the output block or a safety use with one-input lock control.

17. The program creation assistance device according to claim 14, wherein on the selection screen, for each safety use to be selected, at least one of a corresponding usage example or a timing chart of the safety input signal and the safety output signal is displayed as a description of each safety use.

* * * * *